United States Patent
Crow

[11] 3,865,241
[45] Feb. 11, 1975

[54] METHOD AND APPARATUS FOR SEPARATING WOOD BARK FROM GRAVEL

[76] Inventor: Gerald W. Crow, 11552 S.W. Lesser Rd., Portland, Oreg. 97219

[22] Filed: May 21, 1973

[21] Appl. No.: 362,376

[52] U.S. Cl. .................. 209/11, 209/19, 209/490, 209/492, 209/472, 209/44
[51] Int. Cl. ............................................ B07b 15/00
[58] Field of Search ......... 209/19, 20, 44, 471, 472, 209/441, 443, 467, 469, 477, 474, 475, 490, 492, 493, 480, 127 C, 131, 11

[56] References Cited
UNITED STATES PATENTS

| | | | |
|---|---|---|---|
| 381,904 | 5/1943 | Grandel et al. | 209/20 |
| 1,355,477 | 10/1920 | Howell | 209/127 C |
| 2,560,429 | 7/1951 | France | 209/13 X |
| 2,699,869 | 1/1955 | Gear | 209/127 C |
| 2,717,692 | 9/1955 | Brown et al. | 209/19 |
| 3,045,825 | 7/1962 | Watson | 209/471 |
| 3,096,277 | 7/1963 | Maestas | 209/131 X |

*Primary Examiner*—Frank W. Lutter
*Assistant Examiner*—Ralph J. Hill
*Attorney, Agent, or Firm*—Klarquist, Sparkman, Campbell, Leigh, Hall & Whinston

[57] ABSTRACT

A bark and bedding gravel mixture is dumped into a hopper and moves along an inclined vibratory conveyor onto a screening section which screens limbs and other large chunks of wood from the bark-and-gravel mixture as well as sand-sized particles. The limbs and wood chunks are reduced to chips and stored for later use. The sand is conveyed to an aggregate storage site for reuse as bedding material. The bark-and-gravel mixture is dropped from an outlet of the screening section toward but short of the infeed end of a vibratory conveyor table through an air stream which blows the majority of the gravel and bark onto the table while oversize rocks fall short of the table. The bark-and-rock mixture moves through vibratory action along the table into a gravel channel which is separated from a second, bark channel by a transversely inclined rampway forming a ridge between the two channels. An air stream directed across the gravel channel toward the rampway induces the bark portion of the mixture, which forms a stratified layer over the gravel under vibration, to move up the rampway and into the bark channel as both the bark and gravel travel downstream on the table. Sand is screened from the bark near the downstream end of the bark channel after the bark has been dried. The cleaned and dried bark moves from the downstream end of the bark channel to a hog which reduces the bark chunks to a size suitable for use as fuel. The gravel moves from the downstream end of the gravel channel to the gravel storage area for reuse in bedding a log storage yard.

13 Claims, 6 Drawing Figures

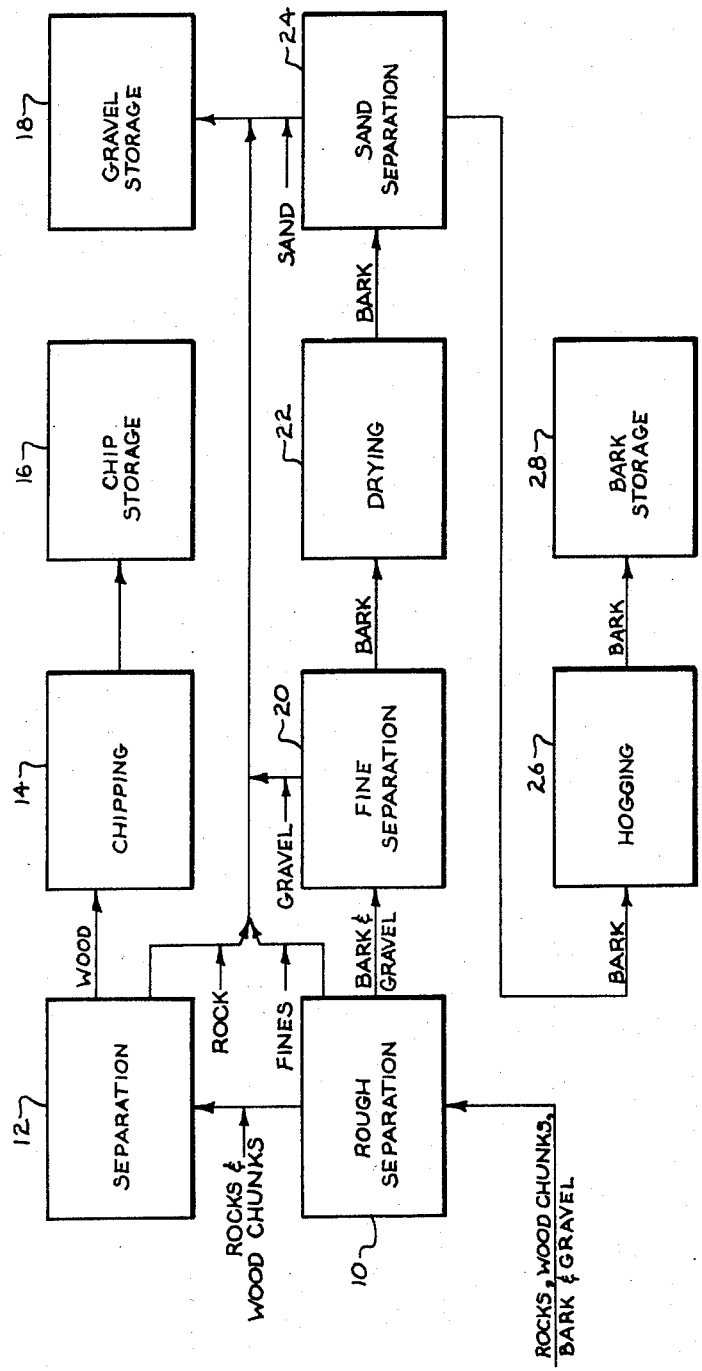

METHOD AND APPARATUS FOR SEPARATING WOOD BARK FROM GRAVEL

BACKGROUND OF THE INVENTION

1. Field of the Invention

The present invention relates to the separation of wood bark from gravel and more particularly to a method and a mechanical separator for accomplishing this.

2. Description of the Prior Art

Nowadays, with the emphasis on reducing water pollution, sawmill logs are increasingly being stored on land rather than in log ponds awaiting transfer into the sawmill. Usually these log storage yards are bedded with gravel. As the logs are moved into and out of the storage yard, chunks of bark and other wood debris fall from the logs and mix with the gravel. This so-called "yard bark" is removed periodically from the yard to keep the yard clean and reduce the fire hazard. The most common method of removal is to scoop up the gravel-bark mixture with a front end loader-type vehicle and dump it someplace as waste. The removed gravel and bark are a complete loss, and the gravel must be replaced with new gravel at considerable expense. Additional expense is involved in transporting the bark-gravel mix to a dumping site.

Although it has been suggested to pave long storage yards to enable the ready removal of yard bark without gravel, paving is expensive and the maintenance of the paved surface is also expensive, particularly in view of the heavy equipment that commonly travels over the yard and the freezing and thawing to which the yard is usually subjected. Accordingly, gravel is still the preferred yard bedding surface.

With the foregoing in mind, it is proposed to reduce the cost and waste involved in cleaning up graveled long storage yards by separating the yard bark from the gravel and reusing the cleaned gravel as a bedding material and using the recovered bark as boiler fuel or mulch or for any other purpose for which the bark may be suited.

Although various types of separators and separating methods have been suggested for separating materials of dissimilar sizes, weights or specific gravities, known separators are not suitable for separating bark and gravel for various reasons. Some prior separators employ a vibratory action to stratify a mixture of materials according to their specific gravities, and thus obtain separation. Others employ an air stream through which a mixture is dropped so that lighter weight materials of the mixture are blown further away from the air stream outlet than the heavier materials. Screening apparatus is also commonly used to separate materials according to size. However, insofar as is known, none of the common separating techniques have been used in a manner or in an apparatus that would be suitable or efficient for separating a mixture of yard bark and gravel so completely that the separated yard bark and grove can be utilized for productive purposes.

SUMMARY OF THE INVENTION

The present invention is a unique method and apparatus for separating yard bark from gravel simply, efficiently, inexpensively and on a continuous basis so that the gravel can be reused as a bedding material and the recovered bark can be converted readily to a form usable as a fuel or mulch or other applications.

The method and apparatus of the invention also provide for the preliminary rough separation of oversized extraneous materials such as limbs, large wood chunks, large rocks and fine particles from the basic gravel-bark mixture prior to fine separation of the bark from the gravel.

The method and apparatus also enable the recovery of limbs and large wood chunks and conversion of such materials into usable wood chips.

A primary feature of the invention is the fine separation of the bark from the gravel on a vibratory conveyor table subdivided lengthwise into separate gravel and rock channels by a transversely inclined rampway extending at an inclination from the gravel channel toward the bark channel. The gravel-and-bark mixture is introduced into the gravel channel and is both moved along such channel and stratified into an upper bark layer and a lower gravel layer by vibratory action as a transverse air stream blows across the gravel channel toward the inclined rampway to scalp the upper layer of bark from the gravel and move it up the rampway and into the bark channel. Thereafter both the gravel and the bark vibrate downstream on the conveyor table in their respective channels.

Additional features of the invention are the drying of the bark as it moves along the vibratory conveyor table and the screening of sand from the dried bark as it nears the downstream end of the conveyor table so that the bark is dry and clean, ready for reduction to a suitable size for a desired end use by the time it reaches the downstream end of the conveyor.

The foregoing and other objects, features and advantages of the present invention will become more apparent from the following detailed description, which proceeds with reference to the accompanying drawings.

BRIEF DESCRIPTION OF THE DRAWINGS

In the drawings:

FIG. 6 is a block flow diagram of the general rock-bark separating process in accordance with the method of the invention.

DETAILED DESCRIPTION

General Process

Figure 1:
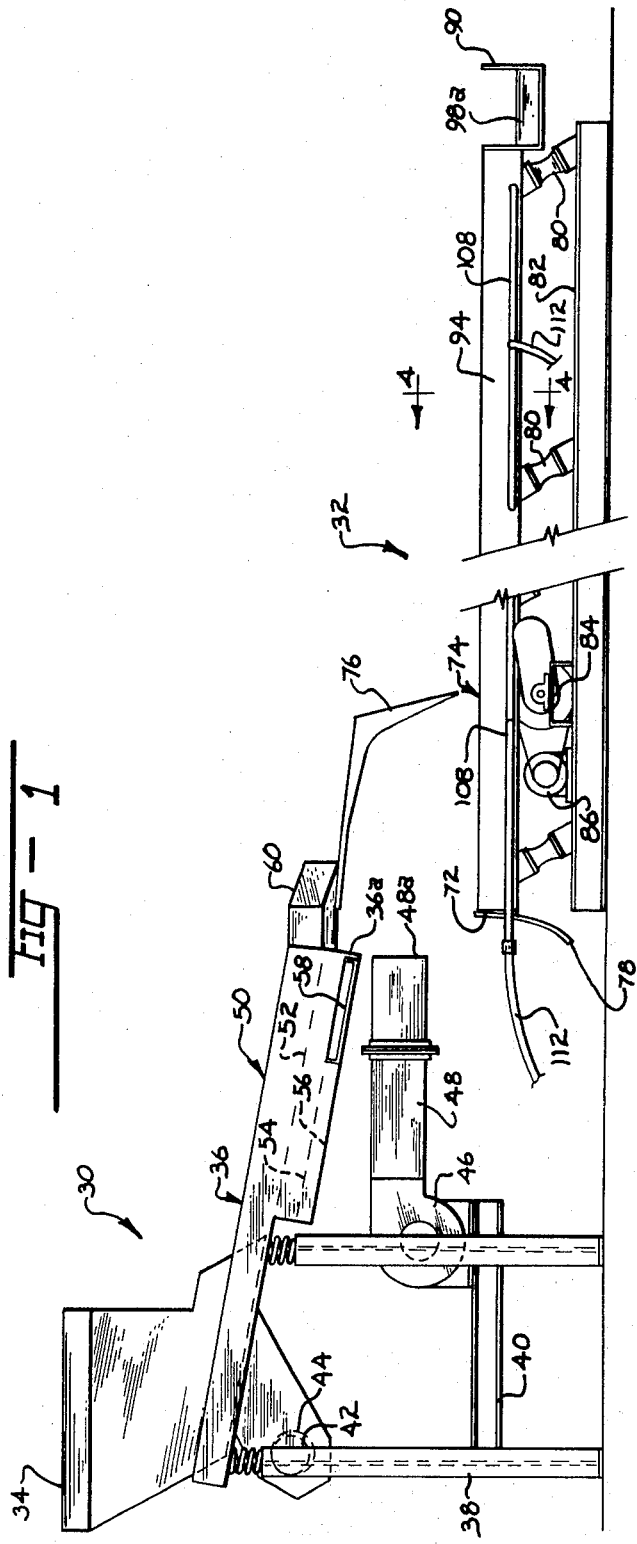
FIG. 1 is a foreshortened side elevation of a separating apparatus in accordance with the invention.

The general method and system for processing the bark-and-gravel mixture will first be explained with reference to the flow diagram of FIG. 6.

First the mixture which will usually include some large rocks or boulders, some large wood chunks or limbs not normally classifiable as bark and some finer sand or sand-like particles undergoes rough separation at station 10, which includes separation by size using, for example, screening devices to separate the fines, large boulders and limbs and wood chunks from the gravel and bark. The larger rocks are then separated from the wood chunks and limbs at a second separating station 12, usually by a weight differentiation technique. From station 12 the wood chunks and limbs are conveyed to a wood-chipping device 14 where the wood is converted to chips suitable for use in the production of pulp in a papermaking process. The resulting chips are conveyed to a chip storage area 16.

At the same time the larger rocks resulting from the separating process at 12 are moved to a gravel and rock storage site at 18.

The bark-and-gravel mixture remaining after rough separation at 10 then undergoes fine separation in a fine separator apparatus at 20. In the fine separation step, the bark is separated from the gravel using a density differentiation technique which, in the case of bark and gravel, could include a water flotation technique, but which in the preferred embodiment involves the use of a combination of vibration, air and mechanical barriers. These means are embodied in a vibratory conveyor apparatus having a gravel channel and a bark channel separated by a transversely inclined plane terminating at a ridge between the two channels.

Following fine separation, the bark is dried at 22. The drying combined with vibration removes sand from the bark, and this sand is separated from the bark at 24, which in the illustrated embodiment is a sand screen in the bark channel of the vibratory conveyor. The sand removed from the bark can then be conveyed to the gravel storage area 18 for eventual reuse with the recycled gravel and larger rocks as a part of the bedding material for the log storage yard.

The cleaned and dried bark remaining after sand separation is conveyed to a conventional hogging apparatus at 26, where the bark chunks are reduced to a size suitable for use as a fuel or mulch. The hogged bark is conveyed to the bark storage area 28.

DESCRIPTION OF PREFERRED EMBODIMENT

Figure 2:
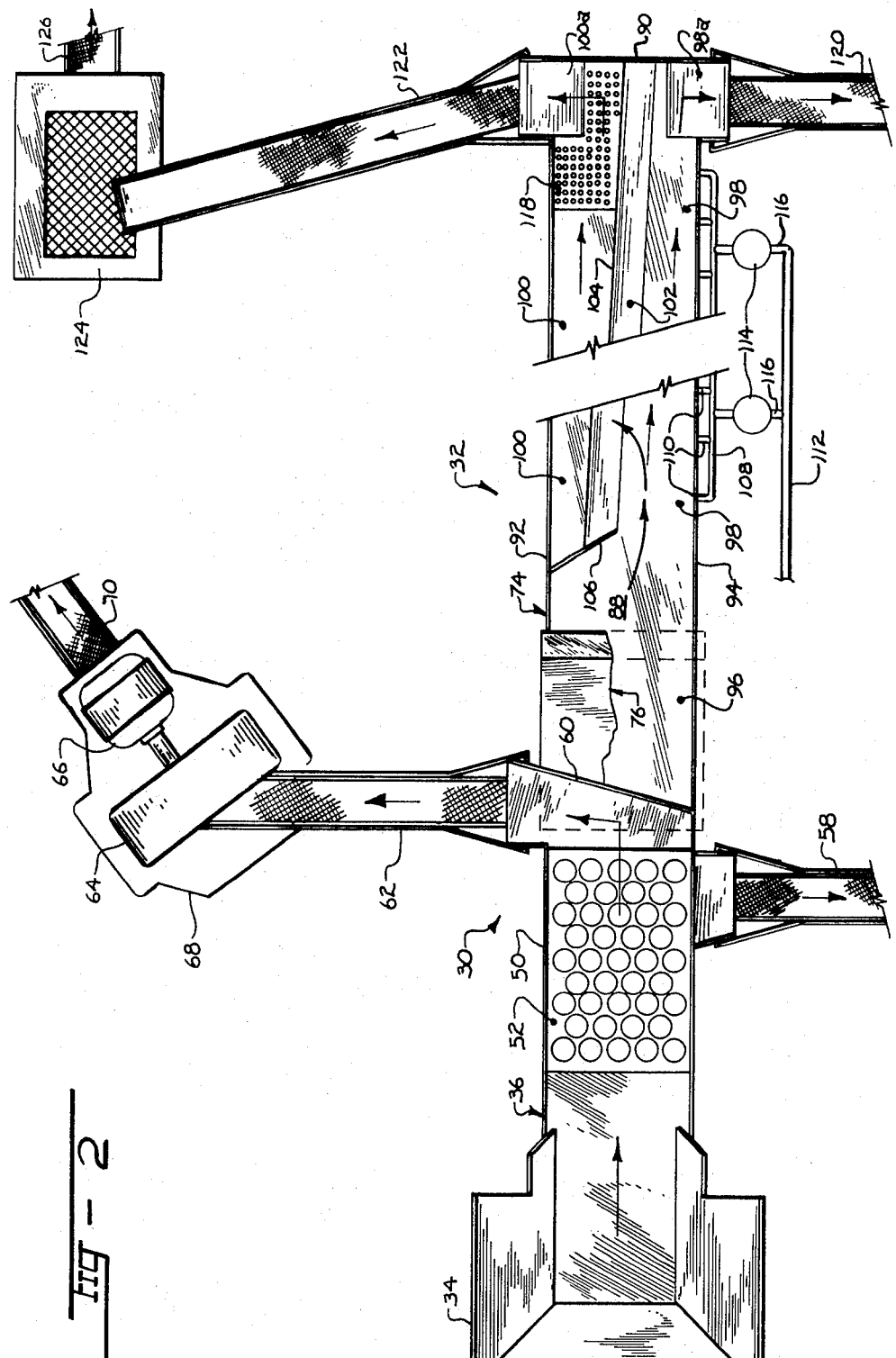
FIG. 2 is a foreshortened top plan view of the apparatus of FIG. 1.
Figure 3:
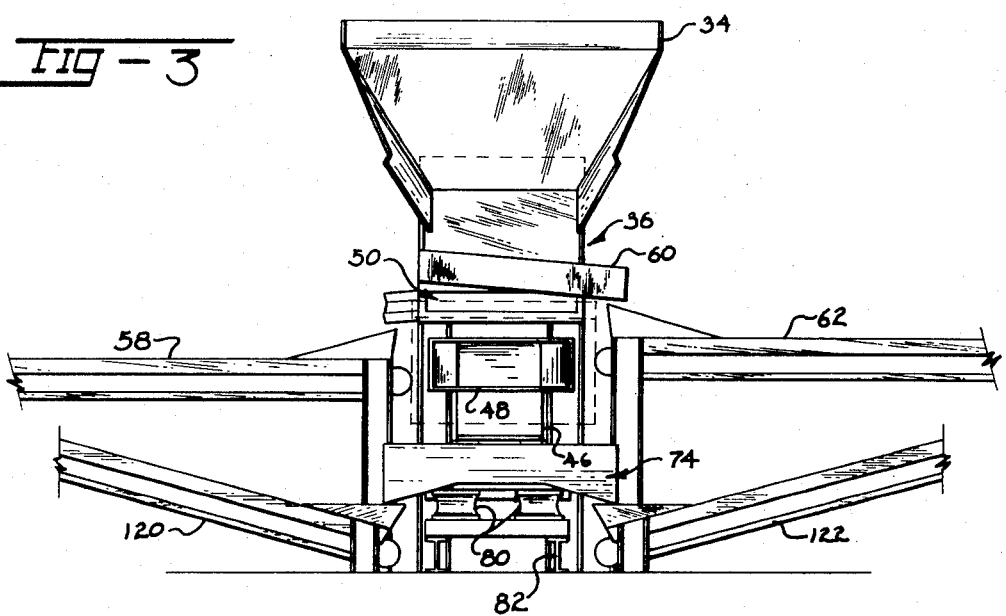
FIG. 3 is an end elevation of the apparatus of FIGS. 1 and 2.

With reference to FIGS. 1 and 2, the illustrated embodiment of an apparatus suitable for carrying out the foregoing described process includes a rough separation portion indicated generally at 30 just upstream from a fine separation portion indicated generally at 32.

The rough separation portion includes a hopper 34 for receiving the mixture of materials to be separated, the hopper being mounted at the upper end of an inclined trough-shaped vibratory conveyor structure 36 supported for vibratory movement on legs 38. The legs also support a horizontal platform 40 which carries a vibrator device 42 and a vibratory drive motor 44. The platform also supports an air blower 46 having a horizontally directed outlet duct 48 terminating at its outer end 48a just below an outlet end 36a of the inclined trough conveyor 36.

The inclined trough conveyor 36 includes a tri-level screening section 50 having an upper screening level 52 with large openings which permit bark, rock and finer particles to fall therethrough but prevent large chunks of wood and limbs from falling through to the second screen level 54. The second level 54 has fine mesh openings permitting only the finest sand-sized particles to fall through to the third, floor level 56. The fine particulates at floor level 56 are conveyed laterally from the lower end of the screening section by a conveyor 58, shown most clearly in FIG. 2.

A diverter member 60 is mounted at the downstream end of screen section 50 at the upper screen level 52 to divert limbs and large wood chunks from such upper level onto a conveyor 62. Conveyor 62 leads laterally to a chipper machine 64 of conventional well-known construction driven by a motor 66. Both the chipper and motor are suitably mounted on a platform 68. Chips produced in the chipper are fed into a chip conveyor 70 which conveys the resulting chips to a chip storage area, not shown but indicated generally at 16 in FIG. 6.

From FIG. 1 it will be seen that the outlet end 36a of screening section 50, at level 54, terminates short of the infeed end 72 of a vibratory conveyor table 74 of the fine separating means 32, and also at a considerable distance above such infeed end. The downstream end 48a of the blower duct 48 also terminates short of the infeed end of the conveyor table at a level between the outlet end of screening section 50 and such infeed end. The air stream produced by the blower 46 thus is directed horizontally over the infeed end of the conveyor table toward a deflector member 76. The deflector extends outwardly over the vibratory conveyor table 74 from the outlet end of the screen section 50 and then downwardly toward the conveyor table. As bark and rocks of various sizes fall vertically from the outlet end 36a of screen level 54, they drop through the air stream created by blower 46. The bark and smaller rocks (classified as gravel) are blown by the air stream onto the infeed section of conveyor table 74, or against deflector 76 which deflects them onto the conveyor table, while the larger, heavier rocks fall vertically through the air stream and land upstream of the infeed end of the conveyor table. To protect the infeed end of the table and deflect rock away from the table, a rock shield 78 is provided. A rock conveyor (not shown) could also be provided at this point to receive the rocks and convey them to the gravel storage site designated at 18 in FIG. 6.

Conveyor table 74 is mounted by spring members 80 for vibration independent of a fixed base frame portion 82. The base frame mounts a vibration-generating means 84 driven by a suitable vibrator drive motor 86.

Figure 4:
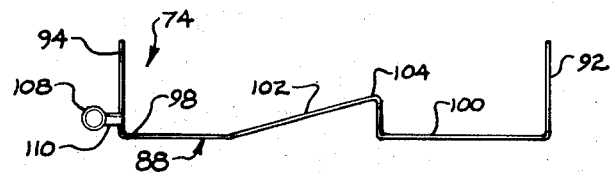
FIG. 4 is a cross-sectional view taken approximately along the lines 4—4 of FIG. 1.

The conveyor table itself includes a floor portion 88 extending from the infeed end 72 to an outfeed end 90 and bounded by upright opposite sidewalls 92, 94. The floor 88 includes a broad flat infeed section 96 onto which the bark-and-gravel mixture is delivered or deflected. Downstream of the infeed section and throughout a major portion of the length of the conveyor table the floor 88 is subdivided lengthwise into two channels, one of which is a heavy material or gravel channel 98, and the other of which is a light material or bark channel 100. The two channels are separated lengthwise by a longitudinally extending transversely inclined rampway 102 terminating at a sharply defined ridge 104 between the two channels. The rampway is inclined upwardly from the gravel channel 98 in a direction toward the bark channel 100. Bark channel 100 is blocked at its upper end by an end guide member 106 which slants in a downstream direction from sidewall 92 to guide material into the open upstream end of gravel channel 98. Thus upon vibration of the table, the gravel-and-bark mixture on infeed section 96 moves downstream only into the gravel channel 98. Because of this, the gravel channel is wider at its upstream end than the bark channel. However, the gravel channel becomes progressively narrower in the downstream direction as the bark channel becomes progressively wider in the same direction to accomodate the progressively lessening amounts of material in the gravel channel and the progressively increasing amounts of material transferred to the bark channel as the bark and gravel travel in the downstream direction. The contour of the floor 88 providing the gravel and bark channels and the separating rampway between the channels is most clearly shown in FIG. 4.

Air manifolds 108 are provided along sidewall 94 throughout most of the length of the gravel channel. Each manifold includes a plurality of air pipes 110 opening through sidewall 94 and directed across the gravel channel toward rampway 102. The manifolds are connected to an air supply pipe 112 leading from a suitable source of pressurized air (not shown). Air flow regulators 114 in branch air supply lines 116 connecting the primary supply pipe 112 to the manifolds 108 regulate the air flow emitted from the various air pipes 110 across the gravel channel to achieve the desired scalping effect. The purpose of the air pipes 110 is to create a transverse air flow across gravel channel 98 at the level of the bark in the channel to help move the lighter weight bark material up rampway 102 and over ridge 104 into the bark channel 100 as the bark and gravel move simultaneously downstream. The vibratory action of the conveyor tends to stratify the bark and gravel so that the bark moves through the gravel channel in a layer above the gravel. Thus the transverse air stream scalps the bark layer from the gravel and moves the bark, with the aid of simultaneous vibration, up the rampway, while the heavier gravel remains in its channel.

As the bark moves downstream on the conveyor table, it is preferably dried before it reaches the downstream end of bark channel 100. Drying can be accomplished by a drying means such as warm air emitted from the air pipes 110 or by, for example, heat lamps (not shown) mounted over the bark channel.

Near the downstream end of the bark channel 100, the floor of such channel is perforate to provide a sand screen section 118 for separating sand from the dried bark before the bark reaches the downstream end of its channel. Since the bark has been previously dried, vibration of the bark chunks causes any sand clinging to the bark to fall from it onto the floor of the channel where the sand screen removes it, preferably to an underlying conveyor (not shown) which moves it to the gravel storage area 18 of FIG. 6.

The channeled length of the conveyor table is made sufficiently long so that by the time the bark and gravel reach the downstream end of such table, they have been completely separated from one another. Thus at the downstream end of the gravel channel 98, the floor of such channel is declined at 98a to cause the gravel to move onto a gravel conveyor 120 which transports the gravel to the gravel storage area 18 of FIG. 6. A similar declined offbear section 100a of the bark channel 100 induces the bark to move onto a bark conveyor 122. This conveyor moves the bark to a conventional hogging machine indicated somewhat schematically at 124 where the bark is reduced to a size suitable for use as boiler fuel. From the hog 124, the reduced bark is moved on a secondary bark conveyor 126 to the bark storage area 28 of FIG. 6.

Figure 5:
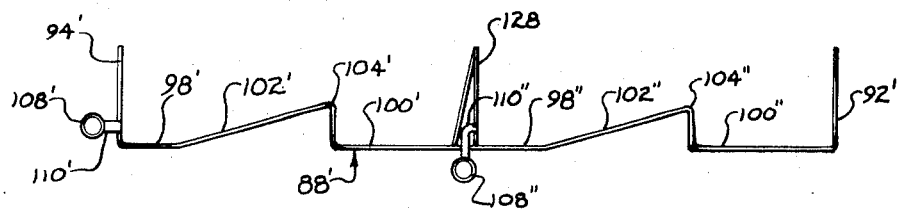
FIG. 5 is a cross-sectional view similar to that of FIG. 4 of a modified form of vibratory conveyor table in accordance with the invention.

FIG. 5 illustrates a modified cross section of a vibratory conveyor table that would be effective to increase the total separating capacity of the fine separating portion of the apparatus. The modification includes a floor 88' which, in the channeled section of the conveyor table, is divided into a pair of gravel channels 98', 98" and a corresponding pair of bark channels 100', 100" separated, respectively, by inclined rampways 102', 102" terminating at abrupt ridges 104', 104". With this variation there is an intermediate longitudinally extending upright wall section 128 separating the first bark channel 100' from the second gravel channel 98", in addition to the usual opposite sidewalls 94' and 92' of the conveyor table. Each pair of gravel and rock channels is provided with its own air manifold and air pipes to create its own independent transverse air stream across each gravel channel. Thus the gravel and bark channels 98', 100' are provided with an air manifold 108' and multiple air pipes 110' while the second pair of rock-and-bark channels 98", 100" have a separate air manifold 108" and air pipes 110" directed across the second gravel channel 102' from within the interior of intermediate divider wall 128.

From the foregoing it will be apparent that other variations in channel arrangement could be devised without departing from the basic concept disclosed. Also various other forms of rough separation means could be provided to accomplish the rough separation function, such as a rotary slatted drum type of separator rotated about a horizontal axis. A mixture of bark, rocks, limbs and wood would be fed into one end of the rotary drum, bark and rocks below a predetermined size would be discharged through openings between the sidewall slats and conveyed to the vibratory channeled conveyor table, while large wood chunks and limbs would be fed from the opposite end of the rotary drum to a chipper.

SUMMARY OF OPERATION

Summarizing the operation of the illustrated apparatus, the bark, rock and limb mixture is received in hopper 34 and moved by gravity and vibration to the rough screening section 50 where large limbs and wood chunks remain on the upper level screen 52 but bark and smaller rocks fall to the second screen level 54 and sand and other fine particles fall to the floor level 56. The fines are conveyed by fines conveyor 58 to rock storage area. The limbs and chunks on upper level 52 are conveyed by limb conveyor 62 to the chipper 64 which converts the limbs to chips. The chips are then conveyed by chip conveyor 70 to a chip storage area. The outlet of the intermediate screen level 54 releases the bark-and-gravel mixture through a horizontally directed air stream which blows the bark and gravel to the infeed section of a vibratory conveyor table while heavier and thus larger rocks fall short of the conveyor table.

The vibratory action of the conveyor table moves the bark-and-rock mixture downstream into a gravel channel 98 and at the same time stratifies the mixture so that the bark forms an upper layer and the gravel a lower layer of the stratification. In the gravel channel the stratified bark and rock is subjected to a transverse air stream which scalps the bark layer from the rock layer and moves the bark with the help of the vibratory action of the conveyor up the inclined rampway 102 and over the ridge 104 into the bark channel 100, where the bark continues its downstream movement as it is dried. Near the downstream end of the bark channel sand removed from the dried bark by vibration is

UNITED STATES PATENT OFFICE
CERTIFICATE OF CORRECTION

PATENT NO. : 3,865,241
DATED : February 11, 1975
INVENTOR(S) : Gerald W. Crow

It is certified that error appears in the above-identified patent and that said Letters Patent are hereby corrected as shown below:

Col. 1, line 37, "long" should be --log--; Column 1, line 59, "grove" should be --gravel--; column 2, line 67, "larger" should be --large--; Column 4, line 6, "into" should be --onto--; Column 7, line 29, Claim 1, "ramway" should be --rampway--.

Signed and sealed this 29th day of April 1975.

(SEAL)
Attest:

RUTH C. MASON
Attesting Officer

C. MARSHALL DANN
Commissioner of Patents
and Trademarks